3,459,781
LIQUID POLYISOCYANATES AND THEIR
STEPWISE PREPARATION
Guenther Kurt Hoeschele, Wilmington, Del., assignor to
E. I. du Pont de Nemours and Company, Wilmington,
Del., a corporation of Delaware
No Drawing. Continuation-in-part of application Ser. No.
381,573, July 9, 1964. This application Nov. 22, 1965,
Ser. No. 509,157
Int. Cl. C07c 119/04
U.S. Cl. 260—453
7 Claims

ABSTRACT OF THE DISCLOSURE

Liquid polyisocyanates of high isocyanate content and low viscosity are produced by phosgenating an amine mixture prepared by (1) reacting formaldehyde with at least about one mole per mole of formaldehyde of an aromatic monoamine; (2) then reacting the reaction product of step 1 with about 0.15 to 1.2 moles per mole of formaldehyde of an aromatic diamine; (3) both of the above steps occurring at a temperature below about 50° C.; (4) then heating the reaction product of step 2 to at least 60° C. to completion of the reaction; the mole ratio of total amines to formaldehyde ranging from about 1.5:1 to 4.5:1.

---

This application is a continuation-in-part of my copending application Ser. No. 381,573, filed July 9, 1964, now abandoned.

This invention relates to liquid polyisocyanate compositions and their preparation.

For many purposes it is desirable to have a polyisocyanate composition which is a liquid of conveniently low viscosity but which, at the same time, is of low volatility (i.e., one which has a low vapor pressure). It has been taught in the prior art that liquid polyisocyanate compositions having a low vapor pressure may be prepared by reacting formaldehyde with a mixture of aromatic amines and phosgenating the resulting product to give a liquid mixture of polyisocyanates. Such a process is taught, for example, in U.S. Patent 3,012,008. From this teaching it would seem that, in order to obtain liquid polyisocyanate compositions of relatively high isocyanate content, one could condense a mixture of an aromatic diamine and an organic monoamine with formaldehyde and phosgenate the resulting product. However, it has been found that the products obtained from such a process are quite viscous materials which are often unsuitable for use in preparing polyurethane materials.

Quite unexpectedly it has been found that liquid polyisocyanates of high isocyanate content and satisfactory viscosity can be produced by the phosgenation of an amine mixture prepared by (1) reacting formaldehyde at a temperature below about 50° C. with at least about one one mole per mole of formaldehyde of an aromatic monoamine selected from the group consisting of aniline, ortho-lower alkyl substituted-aniline, and meta-lower alkyl substituted-aniline in the presence of a mineral acid; (2) further reacting the reaction product of step 1 with about 0.15 to 1.2 moles per mole of formaldehyde of an aromatic diamine selected from the group consisting of m-phenylenediamine, 2-lower alkyl monosubstituted-m-phenylenediamine, and 4-lower alkyl monosubstituted-m-phenylenediamine at a temperature below about 50° C.; (3) and heating the reaction product of step 2 to at least 60° C. for a period of time sufficient to complete the reaction; the mole ratio of total amines to formaldehyde ranging from about 1.5:1 to 4.5:1.

The aromatic monoamine that may be used in practicing this invention may be aniline or aniline substituted in one ortho or meta position with a lower alkyl radical containing one to four carbon atoms, e.g., o-toluidine, m-toluidine, o- or m-ethylaniline, o- or m-propylaniline, o- or m-isopropylaniline, or any of the o- or m-butylanilines. A mixture of any of these monoamines may be used. The aromatic diamine may be m-phenylenediamine or a monosubstituted-m-phenylenediamine in which the substituent is a lower alkyl radical containing one to four carbon atoms, e.g., 2,4-toluenediamine, 2,6-toluenediamine, 2-ethyl-m-phenylenediamine, 4-ethyl-m-phenylenediamine, 2-propyl-m-phenylenediamine, 4-isopropyl-m-phenylenediamine, and 4-isobutyl-m-phenylenediamine. Mixtures of any of these aromatic diamines may be used. The substitutent may be in the 2-position or in the 4-position of the aromatic ring.

Instead of formaldehyde, there may be used materials capable of yielding formaldehyde under the conditions of the process, such as paraformaldehyde, or derivatives of formaldehyde such as dimethoxymethane (formal).

In practicing this invention the molar ratio of total amines to formaldehyde should range between about 1.5:1 and about 4.5:1. If a ratio of less than about 1.5 moles of amine per mole of formaldehyde is used, the final isocyanate composition is too viscous to be of practical use. Operating and economic disadvantages make it undesirable to use more than about 4.5 moles of amine. Of the total amine, at least about one mole per mole of formaldehyde should be the monoamine in order to prepare an isocyanate of satisfactory viscosity. The molar ratio of diamine to formaldehyde should range between 0.15:1 and 1.2:1. At least 0.15 mole of diamine per mole of formaldehyde should be used since it is desired to prepare a product relatively high in isocyanate content per unit weight. Use of more than about 1.2 moles of toluenediamine per mole of formaldehyde will entail operating and economic disadvantages. The diamine will react in only about a molar amount with the intermediate formed in step 1. The excess of unreacted diamine will consequently be lost because of its water solubility or will be converted, during the phosgenation, to the corresponding diisocyanate, which will increase the vapor pressure of the final composition.

The process, except for the step-wise reaction of the monoamine and diamine, is carried out in the conventional manner for reacting formaldehyde with aromatic amines as, for example, in the preparation of methylenedianiline. The reaction is carried out in the presence of a mineral acid. Hydrochloric acid is preferred, although other mineral acids, such as sulfuric acid, may be used. While the exact amount of acid to be used is not particularly critical, the practical range is between about 0.4 and 2 moles per equivalent of amine. The mineral acid will, of course, form salts with the amines present and it is to be understood that the term "mineral acid" is meant to include salts of the acid with the amine. Also the term "amine" has been used to include both free amine and amine present as a salt of the mineral acid.

The initial condensation reaction of formaldehyde with the monoamine (step 1) is carried out at temperatures less than about 50° C. While temperatures as low as 0° C. may be used, the preferred temperature range is about 20 to 45° C. The diamine may be added to the reaction mass as soon as the monoamine and the formaldehyde have been thoroughly mixed. On the other hand, a period of one to two hours at temperatures less than about 50° C. before the addition of the diamine does not affect the physical properties of the resulting isocyanate. The diamine is added while the temperature is maintained at less than about 50° C., that is, in the same range as used for the reaction of formaldehyde with the monoamine. The diamine can be added as a solid, as a liquid (in molten state), or as an aqueous solution. Either the free amine or the salt of the amine with the mineral acid may be added. The rate of addition of the diamine is not critical. After the diamine has been thoroughly dispersed in the reaction mass, the temperature is raised to at least 60° C. The period between the addition of the diamine and the increase in temperature is not critical. The temperature can be as high as is attainable in the solvent and under the particular pressure conditions being used. Under atmospheric pressure, the upper limit is about 100° C. The preferred temperature range is about 65 to 95° C. Pressures higher than atmospheric may be used if desired, but there is usually no advantage to be gained. The reaction mass is held at the elevated temperature for a time sufficient to allow the completion of the reaction. The time required will, of course, depend on the temperature. Times of about one to about eight hours should be sufficient.

The reaction mass is neutralized with a base and the organic phase is separated and freed of water and unreacted amines by vacuum distillation.

The polyamines formed as described above are converted to polyisocyanates by reaction with phosgene by conventional methods. Suitable methods are described in the following U.S. Patent: 2,908,704; 2,822,373; and 2,683,160.

The invention will now be described with reference to the following examples of specific embodiments thereof wherein parts and percentages are by weight unless otherwise specified.

Example 1

To a mixture consisting of 977 g. of aniline (10.5 moles, 960 g. of 37.5% aqueous hydrochloric acid (9.95 moles) and 500 ml. of water, is added 246.5 g. of 36.5% aqueous formaldehyde solution (3.0 moles) at 20–30° C. with stirring. Cooling is necessary to maintain a temperature of less than 30° C. After stirring for 30 minutes at 20° C., 366 g. of 2,4-toluenediamine (3.0 moles) and 290 g. of 37.5% aqueous hydrochloric acid (3.0 moles) is added, and the temperature is raised to 75° C. over a period of one hour. The temperature is maintained at 75 to 80° C. for 5 hours with agitation. The reaction mass is then neutralized with a concentrated potassium hydroxide solution. The organic phase is separated from the aqueous phase and washed twice with hot water. The organic phase is subjected to vacuum distillation to remove unreacted aniline. About 600 grams (6.46 moles of unreacted aniline is recovered. About 688 g. of product polyamines remain as the still residue.

The mixture of polyamines is dissolved in 4000 ml. of o-dichlorobenzene at 50 to 60° C. This solution is slowly added, with vigorous agitation to a mixture consisting of 1150 g. of phosgene (11.6 moles) and 1500 ml. of o-dichlorobenzene while cooling so that the temperature does not exceed 5° C. After the addition of the mixture is complete, phosgene is added directly at a rate of 80 to 100 g. per hour while heating slowly to 160° C. over a period of 5 hours and then at 160 to 170° C. for two hours. The homogenous reaction mixture is swept with nitrogen at 150° C. to remove excess phosgene and hydrochloric acid. The solvent is removed by vacuum distillation. The last amounts of low-boiling impurities are removed at 190° C./1 mm. Hg. About 873 grams of crude isocyanate is obtained containing 36.8% by weight NCO. The product typically has a Brookfield viscosity of about 1520 cps. at 30° C. The liquid isocyanate crystallizes slowly when standing at room temperature for one week.

If, for comparison, the preparation is repeated except that formaldehyde is condensed directly with a mixture of the amines, the resulting crude isocyanate having an isocyanate content of about 37% by weight will typically exhibit a Brookfield viscosity at 30° C. of about 32,100 cps.

Example 2

810 g. of 37% aqueous formaldehyde solution (10 moles) are gradually added to a mixture consisting of 2510 g. of aniline (27.0 moles), 2250 g. of 37.5% hydrochloric acid (27 moles) and 1500 ml. of water at 30° C. with agitation and external cooling. After stirring for 15 minutes at 30° C., 1110 g. of technical m-toluenediamine (9.0 moles) and 950 g. of 37.5% hydrochloric acid (10 moles) are added. The technical m-toluenediamine consists of about 80% of 2,4-toluenediamine, 20% 2,6-toluenediamine, and, as an impurity, contains about 2% of ortho isomers. The temperature is raised to 80° C. over a period of one hour. After heating for 5 hours at 80° C. the reaction mixture is neutralized with potassium hydroxide and worked up in the same way as described in Example 1.

The aniline-free polyamine mixture is dissolved in 10 liters of dry o-dichlorobenzene and slowly introduced into a solution of 2500 g. phosgene (25.25 moles) in 4000 ml. of o-dichlorobenzene. Phosgene is then added continuously at a rate of 150 g. per hour while heating to 165° C. over a period of 5 hours and then maintaining the temperature at 160–170° C. for 3 hours. The product is isolated as described in Example 1. About 2740 grams of crude liquid isocyanate is obtained having an NCO content of about 34.7% and a Brookfield viscosity at 30° C. of about 9000 cps. The product remains free of sediment upon standing at room temperature for at least 2.5 months.

If, for comparison, the preparation is repeated except that the amines are mixed before condensation with formaldehyde, a crude product is obtained typically having an NCO of about 35% and a Brookfield viscosity at 30° C. of greater than about 100,000 cps. On standing, the latter product becomes a viscous tar-like material which is unsuitable for processing.

Example 3

This experiment is carried out in the same way as Example 2 except that the following proportions of materials are used:

| | Moles |
|---|---|
| Aniline | 1.46 |
| Technical m-toluenediamine | 1.2 |
| Formaldehyde | 1.0 |

The liquid polyisocyanate product typically has an NCO content of about 36.9% by weight and a Brookfield viscosity at 30° C. of about 4300 cps. No sediment is formed during storage at room temperature for at least two months.

If, for comparison, the above process is repeated, except that the formaldehyde is reacted with a mixture of the amine hydrochlorides, the crude isocyanate obtained typically has an NCO content of 37.0% by weight and a Brookfield viscosity at 30° C. of greater than about 100,000 cps.

If, for further comparison, the polyamine preparation is repeated except that the m-toluenediamine is reacted first with the formaldehyde and then the aniline is added, the resulting polyamine is only partially soluble in hot o-dichlorobenzene and thus cannot be phosgenated in this solvent. When the amine mixture is dissolved in nitrobenzene and phosgenated, the product is a very viscous material resembling the comparison product described in the preceding paragraph.

Example 4

The procedure of Example 2 is repeated except that the following amounts and materials are used;

|  | Grams | Moles |
|---|---|---|
| Aniline | 408 | 4.4 |
| Technical m-toluenediamine (80% 2,4-toluenediamine and 20% 2,6-toluenediamine essentially free of o-isomer) | 440 | 3.6 |
| Aqueous formaldehyde (36.6%) | 328 | 4.0 |

The resulting crude isocyanate typically has an NCO content of about 36.8% by weight and a Brookfield viscosity of 30° C. of about 8720 cps. The liquid isocyanate is completely free of sediment and does not crystallize when kept at −10° C. for 25 days.

Example 5

To a mixture consisting of 117.8 g. of o-toluidine (1.1 mole), 106.7 g. of 37.6% hydrochloric acid (1.1 mole) and 500 ml. of water, 81.0 g. of 37% aqueous formaldehyde solution (1.0 mole) is slowly added at 30° C. with agitation. After stirring for 10 minutes at 25 to 30° C., 97.4 g. of m-phenylenediamine (0.9 mole) and 87.3 g. of 37.6% hydrochloric acid (0.9 mole) are added at once. The reaction temperature is slowly raised to 90° C. within one hour with stirring and the temperature is held at 90° C. for about 5 hours. 83 g. of sodium hydroxide (2.07 moles) is then added to the reaction mixture, the organic phase is separated, washed twice with hot water, and dried at a pressure of 1 mm. Hg. at 150 to 160° C. A small amount of o-toluidine (about 3 g.) is recovered during this operation.

The polyamine residue is dissolved in 1200 ml. of dry o-dichlorobenzene at 80° C. and is slowly added to a solution of 438 g. of phosgene (4.43 moles) in 500 ml. of o-dichlorobenzene at 0 to 5° C. with vigorous agitation. The temperature is slowly raised to 160° C. within 3 hours while phosgene is continuously introduced at a rate of 80 to 90 g./hr. After holding the reaction mass at 160° C. for 45 minutes the solvent is distilled off at a pressure of 15 mm. Hg. The last traces of solvent and low-boiling compounds are removed at 160° C. and 1 mm. Hg. The resulting product has an NCO content of about 37.2% and a Brookfield viscosity at 30° C. of about 1360 cps.

If, for comparison, a product is prepared under similar conditions except that the formaldehyde solution is added to a mixture containing the o-toluidine and the m-phenylenediamine, the resulting polyamine typically dissolves only to a small extent in hot o-dichlorobenzene. The phosgenation is therefore carried out in nitrobenzene using otherwise the same conditions described above for the phosgenation. The resulting polyisocyanate is typically hard, extremely viscous tar at room temperature having an NCO content of about 38.7%. The Brookfield viscosity cannot be measured at 30° C.

Example 6

The procedure of Example 2 is repeated except that the following amounts and materials are used:

|  | Grams | Moles |
|---|---|---|
| Aniline | 335 | 3.6 |
| Technical m-toluenediamine | 50 | 0.4 |
| Aqueous formaldehyde | 193 | 2.35 |

The liquid polyisocyanate has an NCO content of about 32.8% and a Brookfield viscosity at 30° C. of about 580 cps.

If, for comparison, the process is repeated except that the formaldehyde is added to a mixture of the amine hydrochlorides, the crude isocyanate has an NCO content of about 31.5% and a Brookfield viscosity at 30° C. of about 1560 cps.

Example 7

To a mixture consisting of aniline (558 g., 6.0 moles), water (550 g.) and 37% hydrochloric acid (592 g., 6.0 moles), a 36.2% aqueous formaldehyde solution (305 g., 3.68 moles) is added with agitation at 35–40° C. After the addition is complete, a warm solution (70° C.) of technical m-toluenediamine (102 g., 0.836 mole) in 18.5% hydrochloric acid (172 g., 0.87 mole) is added at once. The temperature is raised to 85° C. within 45 minutes and maintained at 80–85° C. for four hours.

The reaction mixture is neutralized by addition of 40% sodium hydroxide solution (690 g., 6.9 moles). The organic phase (bottom layer) is separated from the aqueous layer at 85–90° C. and washed twice with water (500 g.) at 90° C. Then the organic phase is freed of water and unreacted aniline (8.5 g.) by distillation under vacuum (final pot temperature 150° C./0.5 mm. Hg).

The polyamine is dissolved in dry o-dichlorobenzene (4000 ml.) at 60° C. and phosgenated according to the procedure described in Example 1 yielding about 790 g. of phosgenation product. The polyisocyanate has an isocyanate content of about 34.1% and a Brookfield viscosity at 30° C. of about 270 cps. The polyisocyanate is free of sediment after standing at about 4° C. for 30 days.

Polyisocyanate compositions can be prepared in accordance with this invention which are liquids having relatively low viscosities, that is, Brookfield viscosities at 30° C. in the range of about 200 to about 12,000 centipoises and having good stability against formation of sediment. In contrast, the reaction product of formaldehyde with the premixed amines yields isocyanate compositions which are much more viscous materials, which are more difficult to handle, and which have poorer solubilities in organic solvents. Also, highly viscous materials of poor stability are obtained when the diamine is allowed to react with formaldehyde before the addition of the monoamine.

The liquid polyisocyanate compositions of this invention, because of their low viscosity, excellent stability, good solubility, and reasonable cost are highly useful for the preparation of urethane polymers. They are especially useful for the preparation of rigid foams by the "one-shot" technique, in which the polyisocyanate, a hydroxyl-containing polymer, and a foaming agent are mixed together and allowed to react in the presence of a catalyst. The liquid polyisocyanate compositions may also be used in preparing adhesives, coating compositions, and treating agents for fibrous materials such as textiles and paper.

What is claimed is.

1. In a process for preparing a polyisocyanate composition having a Brookfield viscosity at 30° C. in the range of about 200 to about 12,000 centipoises, by phosgenating an amine mixture to form the corresponding polyisocyanate, the improvement wherein said amine mixture is prepared by a stepwise reaction as follows: (1) reacting formaldehyde at a temperature below about 50° C. with at least about one mole per mole of formaldehyde of an aromatic monoamine selected from the group consisting of aniline, ortho-lower alkyl substituted-aniline, meta-lower alkyl substituted-aniline in the presence of a mineral acid; (2) further reacting the reaction product of step (1) with about 0.15 to 1.2 moles per mole of formaldehyde of an aromatic diamine selected from the group consisting of m-phenylenediamine, 2-lower alkyl monosubstituted-m-phenylenediamine, and 4-lower akyl monosubstituted-m-phenylenediamine at a temperature below about 50° C.; (3) and heating the reaction product of step 2 to at least 60° C. for a period of time sufficient to complete the reaction; the mole ratio of total amines to formaldehyde ranging from about 1.5:1 to 4.5:1.

2. The liquid polyisocyanate composition produced by the process of claim 1.

3. In a process for preparing a polyisocyanate composition having a Brookfield viscosity at 30° C. in the range of about 200 to about 12,000 centipoises, by phosgenating an amine mixture to form the corresponding polyisocyanate, the improvement wherein said amine mixture is prepared by a step-wise reaction as follows: (1) reacting formaldehyde at a temperature between about 20° and 45° C. with at least about one mole per mole of formaldehyde of an aromatic monoamine selected from the group consisting of aniline, ortho-lower alkyl substituted-aniline, meta-lower alkyl substituted-aniline in the presence of about 0.4 to 2 moles per equivalent of total amine of hydrochloric acid; (2) further reacting the reaction product of step (1) with about 0.15 to 1.2 moles per mole of formaldehyde of an aromatic diamine selected from the group consisting of m-phenylenediamine, 2-lower alkyl monosubstituted-m-phenylenediamine, and 4-lower alkyl monosubstituted-m-phenylenediamine at a temperature between about 20° and 45° C.; (3) and heating the reaction product of step 2 to a temperature between about 65° and 95° C. for a period of about 1 to 5 hours; the mole ratio of total amines to formaldehyde ranging from about 1.5:1 to 4.5:1.

4. A process as defined in claim 3 wherein the aromatic monoamine is aniline.

5. A process as defined in claim 3 wherein the aromatic monoamine is o-toluidine.

6. A process as defined in claim 3 wherein the aromatic diamine is m-phenylenediamine.

7. A process as defined in claim 3 wherein the aromatic diamine is a toluenediamine.

References Cited

UNITED STATES PATENTS

| | | | |
|---|---|---|---|
| 2,683,730 | 7/1954 | Seeger et al. | 260—453 |
| 3,012,008 | 12/1961 | Lister | 260—453 X |

FOREIGN PATENTS

| | | |
|---|---|---|
| 842,154 | 7/1960 | England. |
| 1,065,939 | 4/1967 | England. |

JOSEPH P. BRUST, Primary Examiner

S. T. LAWRENCE III, Assistant Examiner

U.S. Cl. X.R.

117—121; 260—2, 75, 77, 570